Nov. 26, 1935.   D. C. KLAUSMEYER   2,022,355
DISCRIMINATING CLAMP ACTUATING MECHANISM
Original Filed March 12, 1929   2 Sheets-Sheet 1
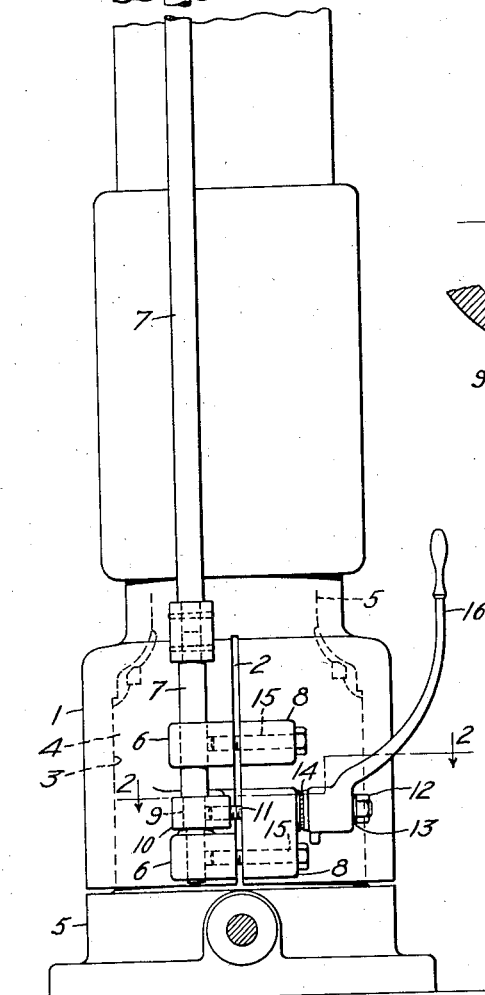
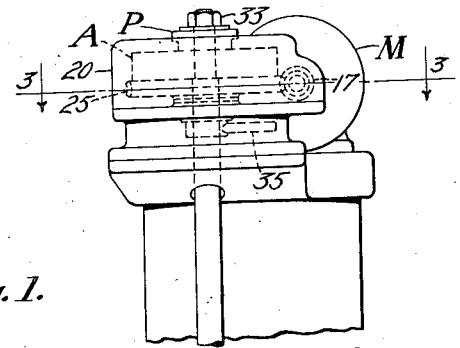
Inventor
DAVID C. KLAUSMEYER
DECEASED
BY H. HENRY SUNDERMANN
EXECUTOR
By Attorneys
Nathan, Bowman & Helfrich

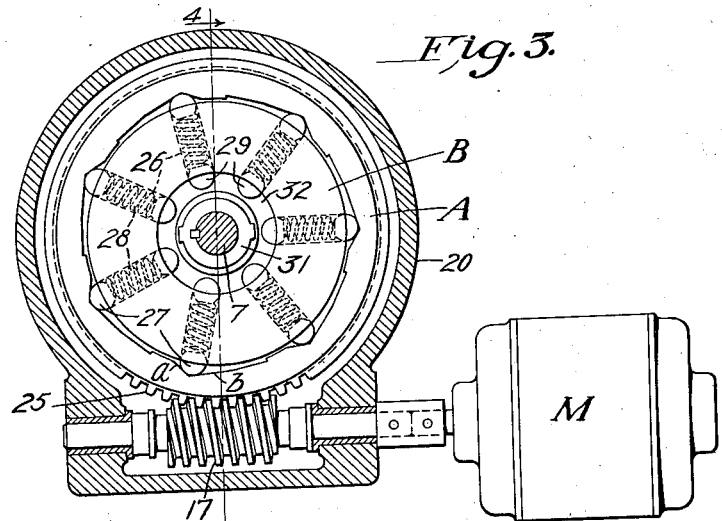
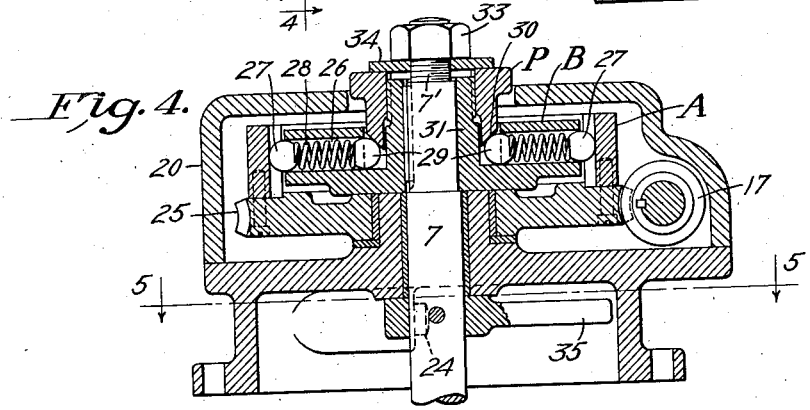
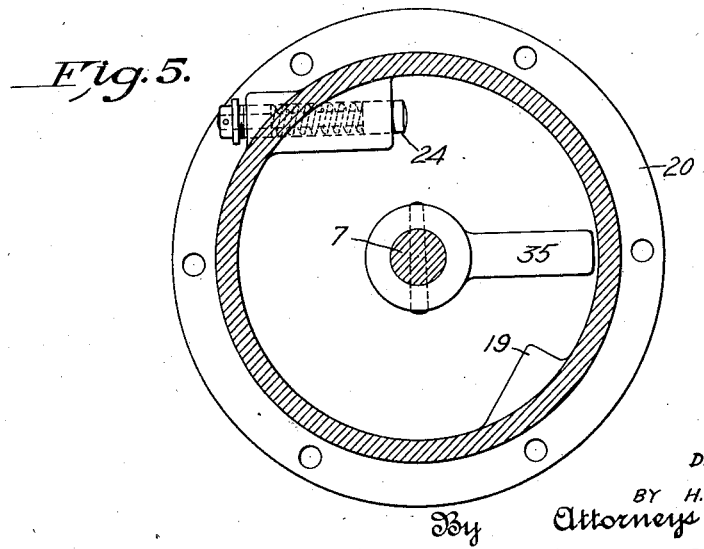

Patented Nov. 26, 1935

2,022,355

UNITED STATES PATENT OFFICE 2,022,355

DISCRIMINATING CLAMP ACTUATING MECHANISM

David C. Klausmeyer, deceased, late of Cincinnati, Ohio, by H. Henry Sundermann, executor, Cincinnati, Ohio, assignor to The Cincinnati Bickford Tool Company, Cincinnati, Ohio, a corporation of Ohio Original application March 12, 1929, Serial No. 346,462. Divided and this application June 7, 1932, Serial No. 615,868

3 Claims. (Cl. 77—28)

This application is a division of application, Serial No. 346,462, filed March 12, 1929 by David C. Klausmeyer, which has matured into Patent No. 1,875,017 dated August 30, 1932.

The present invention relates to clamping mechanisms such as may be used, for example, to clamp a movable portion of a machine tool to a stationary portion thereof during a machining operation.

A primary object of the invention is to provide a power actuated clamping mechanism in which the force capable of being transmitted to the clamp during the clamping action will be substantially less than the force capable of being transmitted thereto during an unclamping action, whereby the possibility of so tightly setting the clamp that it cannot be opened by the power means is precluded.

Another object is to provide a clamping mechanism and power actuating means therefor so constructed and arranged that the prime mover of said power actuated means may continue to operate after the clamping or unclamping action has been completed, without injury to the clamp device, the clamp actuating mechanism or the prime mover.

Still another object of this invention is to provide a power actuated clamping mechanism embodying a relatively small electric motor and power multiplying gearing intermediate the motor and the clamp means, whereby the relatively small motor is rendered capable of transmitting a relatively great force to the clamp means.

These and other objects have been attained by the provision of a clamp mechanism comprising a contractile and expansile element adapted to be actuated, to effect clamping and unclamping action, by forward and reverse movements of an oscillatory shaft. Other forms of clamp elements, however, may be employed. A reversible electric motor is connected, by speed reduction gearing, preferably of the worm and worm-wheel type, with the clamp actuating shaft. The flow of current to said motor, to effect forward and reverse rotation of the shaft, is controlled by suitable manually actuable switches, preferably located in a position readily accessible to the operator of the machine tool. Means also is provided for rendering ineffective the driving connection between the motor and the clamp when the resistance to movement has reached a predetermined value, both in clamp closing and clamp opening movements, without discontinuing the actuation of the prime mover.

To insure that the power means will, at all times, be capable of opening the clamp, after having previously closed it, this invention proposes to embody in the power drive, between the motor and the clamp, a discriminating slip-clutch adapted to transmit a substantially greater torque in clamp opening movement than in clamp closing movement.

While this invention will be shown and described as embodied in a power actuated clamp means, it is to be understood that it is in nowise limited to such embodiment but may also be employed, to advantage, in manually actuable clamps.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1 is an elevational view of a portion of a machine tool embodying the present improved clamp actuating means. Fig. 2 is a detail sectional view on the line 2—2 of Fig. 1. Fig. 3 is a horizontal sectional view on the line 3—3 of Fig. 1, showing the connection between the actuating motor and the clamp actuating shaft, later to be referred to. Fig. 4 is a vertical section on the line 4—4 of Fig. 3 but showing, in addition, adjusting means to vary the tension on the detent elements thereby to vary the torque adapted to be transmitted. Fig. 5 is a section substantially on the line 5—5 of Fig. 4.

Referring more specifically to the drawings, and particularly to Figs. 1 and 2, one form of the invention is disclosed as comprising a contractile and expansile clamp element 1 in the nature of an annular sleeve, split as at 2 and adapted to be contracted to cause its inner surface 3 to grip the outer cylindrical surface 4 of a post or column 5, thereby to lock the two elements together to prevent relative movement therebetween. Projecting from the clamp element, at one side of the split 2, are ears 6 within which is journaled a clamp actuating shaft 7. Complemental ears 8 are also formed on the clamp element 1 at the opposite side of said split. Intermediate the ears 6 the shaft 7 is provided with an eccentric portion 9 surrounded by a strap 10 into which is threaded a draw bolt 11 which projects through one of the ears 8 and has its head 12 connected to the ear 8 through the medium of a bushing 13 and thrust bearing 14. It will readily be perceived that oscillation of the shaft 7 to the position shown in Fig. 2 will move the bolt axially and thereby effect contraction of the clamp element 1, and that oscillation of the shaft from that position will permit the clamp element to open due to the resiliency of the metal therein. Limit bolts 15 passing loosely through the ears 8 and threaded into the ears 6 serve to limit the expansion of the clamp element. A hand lever 16 fixed to the draw bolt 11 may be utilized to rotate said bolt, which, through its threaded connection with the strap 10, will effect relative axial movement between the strap 10 and the bolt-head 12 and thereby contract, or permit to expand, the clamp element 1.

This invention relates primarily to the provision of power means for actuating the clamp element and to that end a suitable prime mover is connected to effect oscillation of the shaft 7. This power means preferably comprises a reversible electric motor M. Inasmuch as the shaft 7 requires only a partial rotation to effect a complete movement of the clamp element it has been found desirable to employ reduction gearing between the motor and the shaft whereby the motor may make a substantial number of rotations while the clamp actuating shaft is making only a partial rotation. This conveniently may be effected by the use of a worm 17 and a cooperating worm-wheel 25, the former being connected to the motor shaft and the latter being operatively connected with the shaft 7, as later will be described.

The parts are normally so adjusted that, as the eccentric approaches its dead center position as shown in Fig. 2, the clamp element will be tightly gripped upon the member 6. If for any reason, such for example as because of wear, the eccentric should pass through its dead center position without completely closing the clamp, an abutment 19, provided by a casing 20 which houses the worm 17 and worm-wheel 25, will engage an arm 35 fixed to the shaft 7 and prevent further rotation of the shaft 7. A yielding abutment 24 is adapted to engage the arm 35 upon complete opening of the clamp.

When the clamp has been completely closed, or completely opened, the motor may continue to run until the operator causes, or permits, the circuit thereto to be broken. This continued actuation of the prime mover is rendered possible by reason of the fact that the worm-wheel 25, which is engaged by the worm 17, is completely circular and is connected with the shaft 7 by a slip-clutch device positive in its action to transmit to said shaft a predetermined torque in each direction of rotation and then to slip. This slip-device comprises two members A and B which are arranged, preferably in nested relation, and which are relatively movable both in a clockwise and in a counter-clockwise direction. One of these members may be utilized as a driver and the other as a follower. In the arrangement shown the female member A is secured upon the worm-gear 25 and serves to drive the male member B, which is keyed to the shaft 7. The member B is provided with a series of radial perforations 26 in which are located a series of detents 27 which are normally pressed radially outward by means of expansile springs 28, which are adjustable as to tension as will presently be described. These detents are shown in the form of hardened balls and they normally engage an annular run-way affording two series of facets $a$ and $b$ provided by the female member A. These facets are inclined in opposite directions and at different angles to a radial line intersecting their point of connection at which point the balls 27 bear, under the action of the springs 28. The facets $a$ are disposed at a more acute angle to a radial line than are the facets $b$. Consequently it requires greater torque to compel the balls to climb the facets $a$ than to climb the facets $b$. As a result of this construction the device will transmit a greater torque without yielding in the one direction than in the other and yet, by virtue of the fact that the balls are normally seated in the pockets formed by the construction, the device is positive in action within certain limits and quite devoid of any tendency to creep.

The device is so arranged that rotation of the member A in a clockwise direction (as viewed in Fig. 3) effects a clamp closing movement of the shaft 7 and rotation in the opposite direction effects an unclamping action. It will therefore be apparent that a substantially greater torque will be transmitted to the shaft 7 to effect unclamping than to effect clamping. This insures against the clamp being so tightly set that the motor would be unable to release it.

It is desirable to be able to adjust the pressure of the detent balls against the raceway and, inasmuch as there is a plurality of detents, it is desirable that the tension may be adjusted uniformly so that each will bear the same load. This is accomplished by locating a member 29 in the nature of a support for the inner end of each spring. The member 29 may, to good advantage, be in the shape of a ball. These balls are, in turn, supported by the conical face 30 of a collar P which is slidably mounted on the periphery of the hub 31 of the male member B. The end of the collar enters an annular groove 32 which is cut in the outer face of the member B and intersects the radial perforations so as to expose the balls 29 and enable their radial positions, and thereby the tension of the springs 28, to be determined by axially shifting the collar P. The position of the collar is, in turn, determined by a nut 33 acting through a washer 34; the nut being threaded to the extremity 7' of the shaft 7. By turning the nut, the tension of the detents 27 may be regulated at will.

It is to be understood that the torque transmitted from the member A to the member B is sufficient to effect closing and opening of the clamp element 1 and that after the rotation of the shaft has been arrested, either by tightening of the clamp or by contact of the arm with either of the abutments 19 or 24 a continued rotation of the worm 17 by the motor M will cause the balls 27 to ride up the facets $a$ or $b$, dependent upon the direction of rotation, and the member A may continue to rotate relative to the member B.

It will thus be seen that this invention is well adapted to accomplish the objects enumerated in the foregoing.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be comprehended within the meaning and range of equivalency of the following claims:—

Having thus revealed this invention, what is claimed as new and desired to be secured in the following combinations and elements, or equivalents thereof, by Letters Patent of United States:—

1. A column clamping mechanism for a radial drill combining a contractible clamp element; a rotatable eccentric and a draw bolt actuated thereby to contract said clamp element; actuating means for said eccentric including an oscillatory shaft adapted by rotation in one direction to cause said eccentric to effect clamping action and by rotation in the reverse direction to effect unclamping action; a reversible motor; a driving connection between said motor and said shaft, said driving connection including an impositive coupling device adapted to transmit substantially greater torque in one direction of rotation than in the reverse direction, said device comprising a member fixed to said shaft; a second member rotated by said motor, one of said members affording a first series of facets inclined in one direction and at one angle to a radial line and a second series of facets inclined in another direction and at another angle to a radial line; and yielding elements carried by the other member and engaging said facets.

2. In a radial drill having an upright post and a sleeve rotatably mounted thereon and provided at its lower end with a split tubular portion embracing a cylindrical portion of said post; actuating means to contract said split tubular portion to cause it to clamp said sleeve to said post, and means to render said actuating means ineffective thereby to permit said split portion to expand and release said post, said means comprising a vertically arranged shaft journaled in bearings provided by said sleeve at one side of said split; an eccentric on said shaft; a draw bolt having one portion embracing said eccentric and another portion connected with said sleeve at the opposite side of said split; means to oscillate said shaft and eccentric thereby to cause said draw bolt alternately to contract said split tubular portion to cause it to grip said post and to permit it to expand to release the post, said last named means being more effective in its releasing movement than in its gripping movement and comprising a first member secured to said shaft and carrying a plurality of spring-pressed elements; a second rotatable member surrounding said first member and provided with two series of oppositely and unequally inclined facets engaged by said elements, said facets transmitting through said elements rotary movements to said first member and shaft; a first gear connected with said second member; a second gear meshing with and driving said first gear; and a reversible electric motor connected to rotate said second gear in forward and reverse directions.

3. A clamping mechanism for radial drills having a post and a sleeve rotatably journaled thereon comprising an oscillatory shaft and means actuated by the rotation thereof in one direction for clamping said sleeve to the post and by the rotation thereof in the opposite direction for releasing said sleeve from said post; a reversible motor carried by said sleeve, a driving connection between said motor and said shaft including an impositive clutch adapted to transmit substantially greater torque in clamp opening movement than in clamp closing movement, said clutch device comprising a first rotatable member journaled coaxially with said shaft and provided with an internal annular run-way formed of two series of facets inclined at different angles and in opposite directions to radial lines; a second member secured to said shaft and provided with a plurality of spring pressed elements engaging said facets; a worm gear secured to said first member; a worm engaging said worm wheel; and a driving connection between said reversible motor and said worm.

H. HENRY SUNDERMANN,
*Executor of the Last Will and Testament of David C. Klausmeyer, Deceased.*